United States Patent [19]
Blake et al.

[11] Patent Number: 4,944,184
[45] Date of Patent: Jul. 31, 1990

[54] ASYMMETRIC FLEXURE FOR PENDULOUS ACCELEROMETER

[75] Inventors: Graeme A. Blake, Bellevue; Brian L. Norling, Mill Creek; Mitchell J. Novack, Kirkland, all of Wash.

[73] Assignee: Sundstrand Data Control, Inc., Redmond, Wash.

[21] Appl. No.: 338,808

[22] Filed: Apr. 14, 1989

[51] Int. Cl.$^5$ .............................................. G01P 15/13
[52] U.S. Cl. ..................................... 73/514; 73/517 B
[58] Field of Search .................. 73/514, 517 B, 517 R

[56] References Cited
U.S. PATENT DOCUMENTS

| 4,488,445 | 12/1984 | Aske | 73/514 |
| 4,498,342 | 2/1985 | Aske | 73/517 B |
| 4,748,848 | 6/1988 | Scholl et al. | 73/517 B |
| 4,788,864 | 12/1988 | Pier | 73/517 B |

Primary Examiner—John Chapman
Attorney, Agent, or Firm—Michael S. Yatsko; Trevor B. Joike

[57] ABSTRACT

An improved accelerometer of the type that includes a proof mass suspended from a support by one or more flexures, such that the proof mass can pivot with respect to the support about a hinge axis. The proof mass includes a paddle attached to the flexures, the paddle having first and second paddle surfaces. The coil is mounted on the first paddle surface, and the accelerometer includes a stator for mounting the support and for forming a magnetic circuit with the coil. The improvement comprises positioning the flexures such that a plane containing the hinge axis and the center of mass of the proof mass is parallel to one of the paddle surfaces, and closer to one paddle surface than to the other paddle surface. In a preferred arrangement, the plane containing the hinge axis and the center of mass is approximately coplanar with one of the paddle surfaces and with the flexures.

7 Claims, 3 Drawing Sheets

ASYMMETRIC FLEXURE FOR PENDULOUS ACCELEROMETER

FIELD OF THE INVENTION

The present invention relates to accelerometers in which a proof mass is mounted for pendulous motion with respect to a support.

BACKGROUND OF THE INVENTION

A prior art accelerometer with high performance potential is described in U.S. Pat. No. 3,702,073. The accelerometer comprises three primary components, a proof mass assembly, and upper and lower stators or magnetic circuits between which the proof mass assembly is supported. The proof mass assembly includes a movable paddle that is suspended via flexures to an outer annular support ring, such that the paddle can pivot with respect to the support ring. The paddle, flexures and support ring are commonly provided as a unitary structure composed of fused quartz.

Both upper and lower surfaces of the paddle include capacitor plates and force balancing coils. Each force balancing coil is positioned on the paddle such that the central axis of the coil is normal to the top and bottom surfaces of the paddle, and parallel the sensing axis of the accelerometer. A plurality of mounting pads are formed at spaced-apart positions around the upper and lower surfaces of the annular support ring. These mounting pads mate with inwardly facing surfaces of the upper and lower stators when the accelerometer is assembled.

Each stator is generally cylindrical, and has a bore provided in its inwardly facing surface. Contained within the bore is a permanent magnet. The bore and permanent magnet are configured such that an associated one of the force balancing coils of the proof mass assembly fits within the bore, with the permanent magnet being positioned within the cylindrical core of the coil. Current flowing through the coil therefore produces a magnetic field that interacts with the permanent magnet to produce a force on the paddle. Also provided on the inwardly facing surfaces of the stators are capacitor plates configured to form capacitors with the capacitor plates on the top and bottom surface of the paddle. Thus movement of the paddle with respect to the upper and lower stators results in a differential capacitance change.

In operation, the accelerometer is affixed to an object whose acceleration is to be measured. Acceleration of the object along the sensing axis results in pendulous, rotational displacement of the paddle with respect to the support ring and the stators. The resulting differential capacitance change caused by this displacement is sensed by a feedback circuit. In response, the feedback circuit produces a current that, when applied to the force balancing coils, tends to return the paddle to its neutral position. The magnitude of the current required to maintain the paddle in its neutral position provides a measure of the acceleration along the sensing axis.

The sensing axis of a pendulous accelerometer, such as the one described above, is perpendicular to a plane determined by the hinge axis and the center of mass of the proof mass. In nearly all practical accelerometer designs, the sensing axis is aligned with a reference axis defined with respect to the case in which the accelerometer is housed. When aligned in such a manner, the accelerometer output represents acceleration along the reference axis, and is insensitive to cross axis accelerations. High performance accelerometers must have very low cross axis sensitivities and, therefore, require close alignment between the sensing axis and the reference axis. This alignment is set by actively measuring and correcting the alignment before fixing the sensor in the case.

Force rebalance accelerometers that have only a single force balancing coil present a problem with respect to sensing axis alignment. In a dual coil design, the pendulously mounted paddle/coil unit, i.e., the proof mass, can be made symmetric, such that the center of mass of the proof mass is located halfway between the upper and lower surfaces of the paddle. In a single coil design, without a counterweight on the opposite side of the paddle from the coil, the center of mass of the proof mass is offset, such that the sensing axis is not perpendicular to the upper and lower surfaces of the paddle. The upper and lower surfaces of the paddle are typically assembled parallel to the mounting surface of the sensor case, because the paddle surfaces are relatively easy to use as references. When the sensing axis is not perpendicular to the paddle surfaces, then it becomes difficult to align the sensing axis to the accelerometer case and mounting surface.

SUMMARY OF THE INVENTION

The present invention provides a means for producing a pendulous accelerometer having a sensing axis that is perpendicular to the paddle surfaces.

The accelerometer in which the present invention is employed comprises a proof mass suspended from a support by one or more flexures, such that the proof mass can pivot with respect to the support about a hinge axis. The proof mass comprises a paddle attached to the flexures, the paddle having first and second paddle surfaces. A coil is mounted on the first paddle surface, and the accelerometer includes means for mounting the support, and means for forming a magnetic circuit with the coil, such that the proof mass can be maintained in a null position.

The improvement to which the present invention is directed comprises positioning the flexures such that a plane containing the hinge axis and the center of mass of the proof mass is parallel to one of the paddle surfaces, and closer to one paddle surface than to the other paddle surface. In a preferred embodiment, the paddle surfaces are mutually parallel. In a further preferred embodiment, the plane containing the hinge axis and the center of mass of the proof mass is approximately coplanar with one of the paddle surfaces.

DETAILED DESCRIPTION OF THE INVENTION

Figure 1:
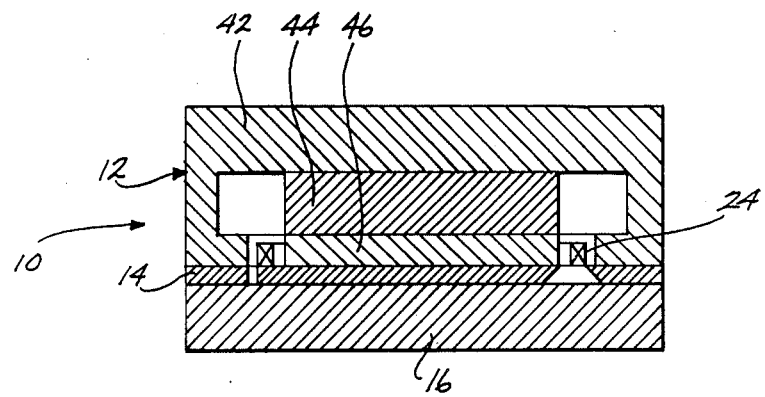
FIG. 1 is a cross-sectional view of an accelerometer that includes the asymmetric flexure arrangement of the present invention.
Figure 2:
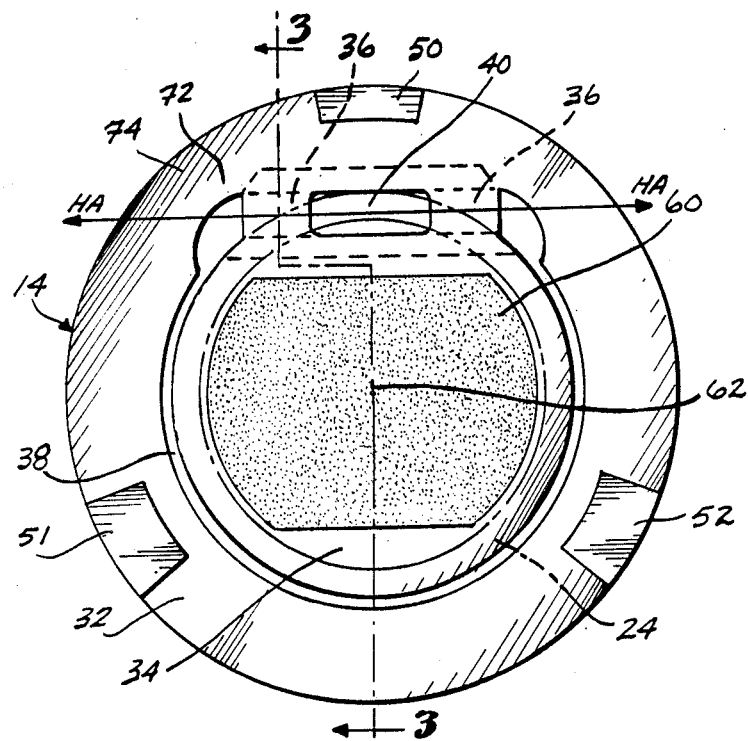
FIG. 2 is a plan view of the reed of the accelerometer of FIG. 1.
Figure 3:
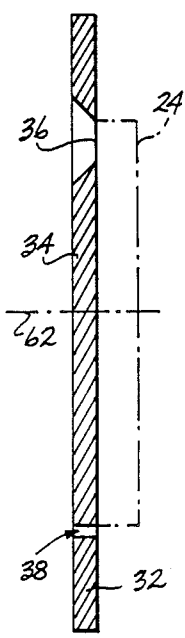
FIG. 3 is a cross-sectional view taken along line 3—3 of FIG. 2.

FIGS. 1-3 illustrate an accelerometer that includes the asymmetric flexure arrangement of the present invention. The accelerometer 10 measures acceleration along sensing axis SA, and includes stator 12, reed 14, and mounting member 16. Reed 14 is held between mounting member 16 and stator 12, and has coil 24 positioned on its upper surface. The stator comprises excitation ring 42, magnet 44 and pole piece 46. The stator is shaped so that coil 24 occupies a comparatively narrow gap between pole piece 46 and excitation ring 42, to provide the force balancing function well known to those skilled in the art.

Reed 14 is shown in greater detail in FIGS. 2 and 3. The reed has an overall disk-like shape, and includes annular support ring 32 and paddle 34 connected to one another via a pair of flexures 36 between which opening 40 is formed. For most of its perimeter, paddle 34 is separated from support ring 32 by circular gap 38. Three raised mounting pads 50-52 are located at approximately equally spaced positions around support ring 32, and three similar mounting pads (not shown) are located immediately beneath mounting pads 50-52 on the lower surface of the support ring. When the accelerometer is assembled, the upper mounting pads 50-52 contact stator 12, while lower mounting pads contact mounting member 16.

Paddle 34 is mounted via flexures 36 such that the paddle can pivot with respect to support ring 32 about hinge axis HA that passes through the midpoints of the flexures and that is horizontal and parallel to the plane of the drawing in FIG. 2. Coil 24 is mounted on the upper surface of paddle 34, such that the outer edge of the coil is approximately coextensive with the outer edge of the paddle, except adjacent flexures 36 where the coil overhangs the flexures and opening 40. A thin shim (not shown) is positioned between coil 24 and paddle 34, such that the coil is positioned a short distance above flexures 36, to avoid interference during paddle movement. Capacitor plate 60 is positioned on paddle 34 within coil 24, and forms a capacitor with the adjacent surface of pole piece 46, or with a second capacitor plate located on the lower surface of the pole piece. The capacitor forms a portion of a pickoff circuit for detecting movement of the paddle from its null position. A second capacitor may be found between plates (not shown) on the lower surface of paddle 34 and on the upper surface of mounting member 16.

Figure 4:
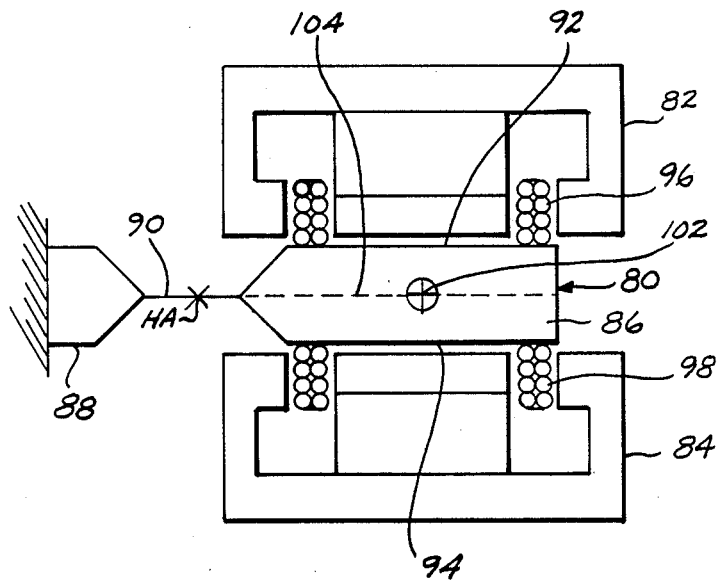
FIG. 4 is a schematic view showing a conventional two-coil accelerometer.

The problem addressed by the present invention is illustrated in the schematic views of FIGS. 4-7. FIG. 4 schematically illustrates a known accelerometer that includes force rebalancing coils and magnetic circuits on both sides of the paddle. In particular, the accelerometer illustrated in FIG. 4 includes reed 80 and upper and lower stators 82 and 84. Reed 80 includes paddle 86 and support ring 88 interconnected by flexure 90. Multiple flexures may also be used, as in FIGS. 1-3. Paddle 86 includes upper and lower surfaces 92 and 94 on which respective coils 96 and 98 are mounted. The paddle can pivot with respect to the support ring about a hinge axis HA that is normal to the plane of the drawing. The support ring 88 to the right of paddle 86 is not shown to simplify the illustration. The illustrated components can be constructed symmetrically such that the proof mass, including paddle 86 and coils 96 and 98, has a center of mass 102 that is positioned in a reference plane 104 that passes through hinge axis HA and center of mass 102, and which is parallel to and lies midway between surfaces 92 and 94 of paddle 86. As a consequence, the sensing axis of the accelerometer is normal to reference plane 104, and therefore to the upper and lower paddle surfaces. An accelerometer of this type therefore requires no angular offset between the reed and case for alignment.

Figure 5:
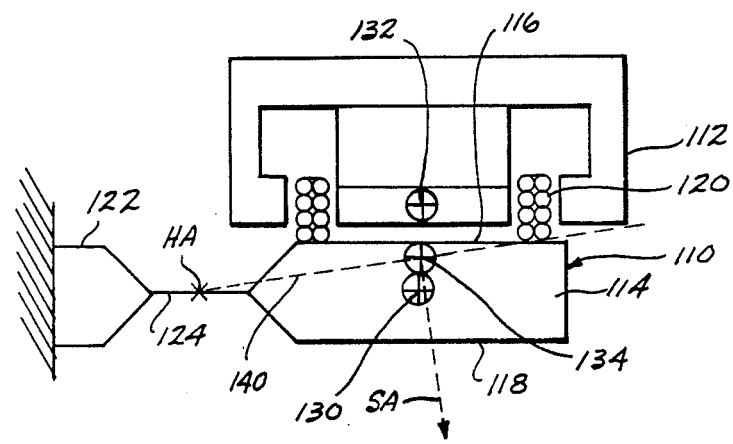
FIG. 5 is a schematic view illustrating the alignment of the sensing axis for a single coil accelerometer without the present invention.

FIG. 5 illustrates the effect of eliminating one of the coils (and the corresponding magnetic circuit), from the design shown in FIG. 4. The accelerometer of FIG. 5 includes reed 110 and stator 112, the reed including paddle 114 having upper and lower surfaces 116 and 118 and coil 120 mounted on surface 116. The paddle is mounted to support 122 by flexure 124 for rotation about hinge axis HA.

In this embodiment, the paddle has a center of mass 130 that is positioned midway between the upper and lower surfaces of the paddle. However, coil 120 has a center of mass 132 that is offset from the paddle center of mass. Therefore, the net center of mass 134 for the proof mass is positioned between centers of mass 130 and 132. As a consequence, reference plane 140 that passes through hinge axis HA and center of mass 134 is not normal to paddle surfaces 116 and 118, and sensing axis SA is therefore not normal to the paddle surfaces. As a result, additional steps must be taken during fabrication of this accelerometer to ensure that the accelerometer is mounted in its case in such a way that sensing axis SA is normal to the case reference axis. This adds another fabrication step, and also introduces another potential source of error.

Figure 6:
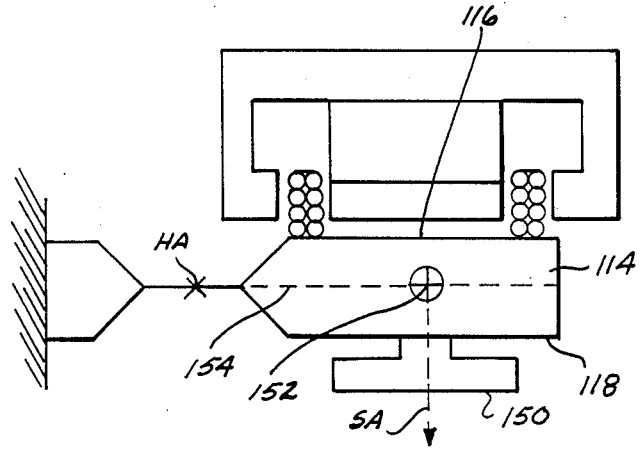
FIG. 6 is a schematic view showing the use of a weight to change the sensing axis alignment.

FIG. 6 illustrates an accelerometer that is identical to the accelerometer shown in FIG. 5 except that weight 150 is now positioned on lower surface 118 of paddle 114. The size and position of the weight may be adjusted such that center of mass 152 of the entire proof mass, including the weight, lies in reference plane 154 that is parallel to, and positioned midway between, paddle surfaces 116 and 118. As a result, sensing axis SA is normal to the paddle surfaces. This arrangement thereby avoids the misalignment described above in connection with FIG. 5, but at the cost of adding another part (weight 150), and increasing the size of the accelerometer.

Figure 7:
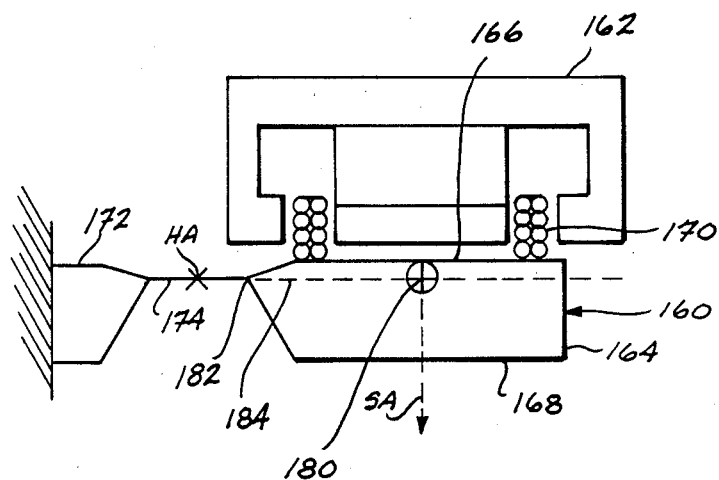
FIG. 7 is a schematic view of the asymmetric flexure arrangement according to the present invention.

FIG. 7 sets forth the solution to the above-described misalignment problem provided by the present invention. In FIG. 7, the accelerometer includes reed 160 and stator 162. Reed 160 includes paddle 164 having upper and lower surfaces 166 and 168, and coil 170 mounted to upper surface 166. Paddle 164 is connected to support 172 via flexure 174, such that the paddle can pivot with respect to the support about hinge axis HA. The entire proof mass has a center of mass 180 that is positioned closer to upper surface 166 than to lower surface 168 of the paddle, as described above in connection with FIG. 5. However, in the accelerometer shown in FIG. 7, reed 160 is constructed such that reference plane 184, defined as the plane including the hinge axis and center of mass 180 of the proof mass, is parallel to paddle surfaces 166 and 168. There are many ways that this alignment can be achieved. For example, for flexures of the type illustrated, the connection point 182 between the flexure and paddle is adjusted such that the hinge axis has the proper position with respect to the center of mass. This is achieved by locating the hinge axis and connection point 182 asymmetrically with respect to the upper and lower paddle surfaces, i.e., reference surface 184 is closer to upper surface 166 than to lower surface 168. The result is that sensing axis SA is normal to surfaces 166 and 168, to produce the advantages described above without the use of an additional part.

The asymmetric flexure hinge connection shown in FIGS. 1-3 and 7 can be made by means of the usual fabrication steps for the reed structure, simply by etching one side of the flexure area to a greater extent than the opposite side of the flexure area. In practice, the arrangement shown most clearly in FIG. 3 is preferred, because all etching at the flexure area is done from one side of the reed, making it easier to control the exact position of the hinge axis. A similar technique could be used if the flexures were circular arc flexures, rather than the illustrated leaf flexures. In particular, a singular semicircular cutout could be made on one side of the reed, while the other side remained flat. In both cases, one surface of the flexure is coplanar with one paddle surface, and the hinge axis is approximately coplanar with the paddle surface opposite the surface in which the flexure was etched, to within one-half of the flexure thickness.

The adjustment of the hinge axis position need not be such as to completely eliminate the need for a weight, but can be provided simply to reduce the required size for the weight. Furthermore, adjustment of the hinge axis position may be used merely to change the orientation of the sensing axis with respect to the paddle surfaces to some desired degree. The principles of the present invention are not limited to the coil/capacitor plate geometry shown in the Figures, and may be applied to an accelerometer in which the capacitor plate is positioned outside the coil on the paddle surface, and to an accelerometer in which an inductive rather than a capacitive pickoff technique is used. Nor is the invention limited to single coil accelerometers illustrated in FIGS. 1-3 and 7, but may be applied to any accelerometer having a pendulously mounted proof mass. The use of asymmetrically placed flexures to reduce or eliminate a counterweight increases the G range of the accelerometer, while making alignment of the sensing and reference axes easier. If the asymmetry is great enough to eliminate completely the counterweight, one surface of the paddle presents a large flat area, suitable for use in a capacitive or inductive position pickoff circuit.

When a coil or counterweight is mounted on this surface, the usable pickoff area is much smaller.

While the preferred embodiments of the invention have been described, variation will be apparent to those skilled in the art. Accordingly, the scope of the invention is to be determined by reference to the following claims.

The embodiments of the invention in which an exclusive property or privilege is claimed are defined as follows:

1. In an accelerometer for measuring acceleration along a sensing axis, the accelerometer comprising a proof mass suspended from a support by one or more flexures such that the proof mass can pivot with respect to the support about a hinge axis, the proof mass comprising a paddle attached to the flexures, the paddle having first and second paddle surfaces and a coil mounted on the first paddle surface, the paddle surfaces being planar and parallel to one another, the accelerometer further comprising means for mounting the support and means for forming a magnetic circuit with the coil such that the proof mass can be maintained in a null position, the improvement wherein the flexures are positioned such that a plane containing the hinge axis and a center of mass of the proof mass is parallel to one of the paddle surfaces, and closer to one paddle surface than to the other paddle surface, the second paddle surface not having a coil or other structure mounted thereon, such that the second paddle surface is accessible for use in a position pick-off system.

2. The improvement of claim 1, wherein the plane containing the hinge axis and the center of mass of the proof mass is approximately coplanar with one of the paddle surfaces.

3. The improvement of claim 2, wherein a surface of each flexure is coplanar with said one paddle surface.

4. The improvement of claim 1, wherein each flexure is a leaf flexure.

5. The improvement of claim 4, wherein exactly two flexures connect the paddle to the support.

6. The improvement of claim 4, wherein the plane containing the hinge axis and the center of mass of the proof mass is approximately coplanar with one of the paddle surfaces and with each flexure.

7. The improvement of claim 6, wherein a surface of each flexure is coplanar with said one paddle surface.

* * * * *